United States Patent
Malyugin et al.

(10) Patent No.: US 9,575,899 B2
(45) Date of Patent: *Feb. 21, 2017

(54) SYNCHRONIZING A TRANSLATION LOOKASIDE BUFFER WITH PAGE TABLES

(71) Applicant: VMware, Inc., Palo Alto, CA (US)

(72) Inventors: Vyacheslav Vladimirovich Malyugin, Los Gatos, CA (US); Boris Weissman, Palo Alto, CA (US); Ganesh Venkitachalam, Mountain View, CA (US); Min Xu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/954,346

(22) Filed: Nov. 30, 2015

(65) Prior Publication Data

US 2016/0085686 A1   Mar. 24, 2016

Related U.S. Application Data

(63) Continuation of application No. 12/485,751, filed on Jun. 16, 2009, now Pat. No. 9,213,651.

(51) Int. Cl.

| G06F 12/00 | (2006.01) |
|---|---|
| G06F 13/00 | (2006.01) |
| G06F 13/28 | (2006.01) |
| G06F 12/10 | (2016.01) |
| G06F 9/455 | (2006.01) |
| G06F 12/08 | (2016.01) |

(52) U.S. Cl.
CPC ....... *G06F 12/1027* (2013.01); *G06F 9/45558* (2013.01); *G06F 12/0891* (2013.01); *G06F 12/109* (2013.01); *G06F 2009/45583* (2013.01); *G06F 2212/152* (2013.01); *G06F 2212/305* (2013.01); *G06F 2212/683* (2013.01)

(58) Field of Classification Search
CPC ................ G06F 12/1027; G06F 12/109; G06F 2009/45583; G06F 9/45558
USPC ......................................................... 711/207
See application file for complete search history.

(56) References Cited

U.S. PATENT DOCUMENTS

| 6,961,806 | B1 | 11/2005 | Agesen et al. |
|---|---|---|---|
| 7,222,221 | B1 * | 5/2007 | Agesen ............... G06F 9/45537 707/999.2 |
| 7,260,815 | B1 * | 8/2007 | Chen ................... G06F 9/45504 717/124 |
| 7,409,487 | B1 | 8/2008 | Chen et al. |
| 7,478,388 | B1 | 1/2009 | Chen et al. |
| 7,783,838 | B1 | 8/2010 | Agesen et al. |
| 8,015,388 | B1 * | 9/2011 | Rihan ................. G06F 12/1045 711/203 |
| 8,060,722 | B2 | 11/2011 | Adams et al. |

(Continued)

*Primary Examiner* — Sheng-Jen Tsai

(57) ABSTRACT

The translation lookaside buffer (TLB) of a processor is kept in synchronization with a guest page table by use of an indicator referred to as a "T" bit. The T bit of the NPT/EPT entries mapping the guest page table are set when a page walk is performed on the NPT/EPT. When modifications are made to pages mapped by NPT/EPT entries with their T bit set, changes to the TLB are made so that the TLB remains in synchronization with the guest page table. Accordingly, record/replay of virtual machines of virtualized computer systems may be performed reliably with no non-determinism introduced by stale TLBs that fall out of synchronization with the guest page table.

42 Claims, 8 Drawing Sheets

(56) References Cited

U.S. PATENT DOCUMENTS

| | | | |
|---|---|---|---|
| 8,307,191 B1* | 11/2012 | Jain | G06F 12/109 |
| | | | 711/202 |
| 8,443,156 B2 | 5/2013 | Adams et al. | |
| 9,213,651 B2* | 12/2015 | Malyugin | G06F 12/1027 |
| 2006/0070065 A1* | 3/2006 | Zimmer | G06F 9/5016 |
| | | | 718/1 |
| 2006/0259734 A1* | 11/2006 | Sheu | G06F 12/1036 |
| | | | 711/203 |
| 2007/0005870 A1* | 1/2007 | Neiger | G06F 12/1009 |
| | | | 711/6 |
| 2008/0005447 A1* | 1/2008 | Schoenberg | G06F 12/109 |
| | | | 711/6 |
| 2008/0040565 A1* | 2/2008 | Rozas | G06F 12/145 |
| | | | 711/163 |
| 2008/0046679 A1* | 2/2008 | Bennett | G06F 12/1009 |
| | | | 711/207 |
| 2008/0082772 A1* | 4/2008 | Savagaonkar | G06F 12/145 |
| | | | 711/163 |
| 2009/0006714 A1* | 1/2009 | Durham | G06F 12/145 |
| | | | 711/6 |
| 2009/0013149 A1* | 1/2009 | Uhlig | G06F 12/109 |
| | | | 711/207 |
| 2009/0043985 A1* | 2/2009 | Tuuk | G06F 12/1036 |
| | | | 711/205 |
| 2009/0300263 A1 | 12/2009 | Devine et al. | |
| 2010/0025869 A1 | 2/2010 | Suzuishi et al. | |
| 2010/0223447 A1* | 9/2010 | Serebrin | G06F 12/0253 |
| | | | 712/225 |
| 2010/0250869 A1* | 9/2010 | Adams | G06F 12/1063 |
| | | | 711/154 |
| 2010/0250895 A1* | 9/2010 | Adams | G06F 12/1009 |
| | | | 711/207 |
| 2010/0274987 A1* | 10/2010 | Subrahmanyam | G06F 12/1036 |
| | | | 711/207 |
| 2010/0318762 A1 | 12/2010 | Malyugin et al. | |
| 2010/0325374 A1* | 12/2010 | Cypher | G06F 12/0607 |
| | | | 711/157 |
| 2012/0059973 A1 | 3/2012 | Adams et al. | |

* cited by examiner

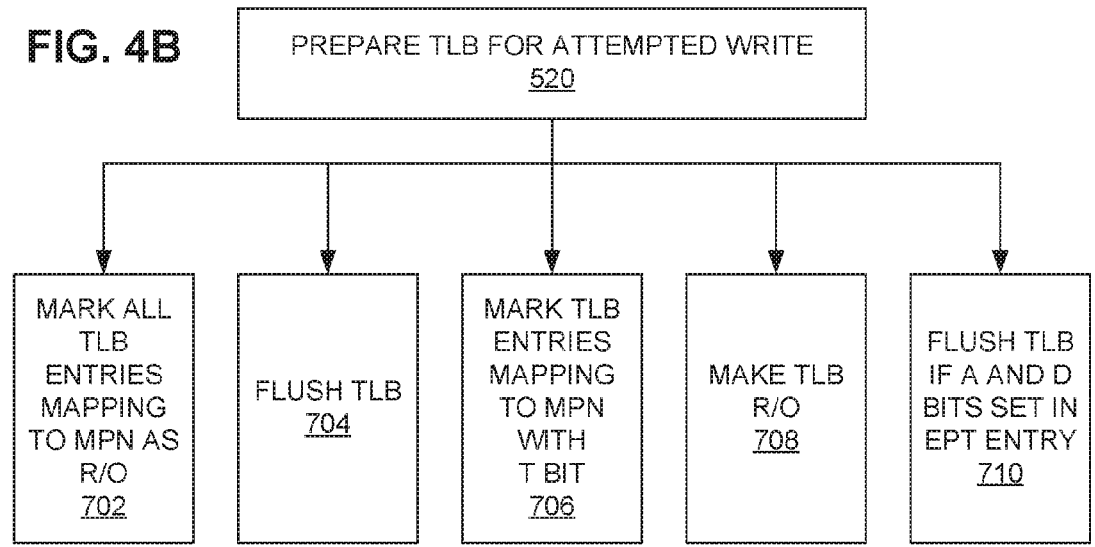
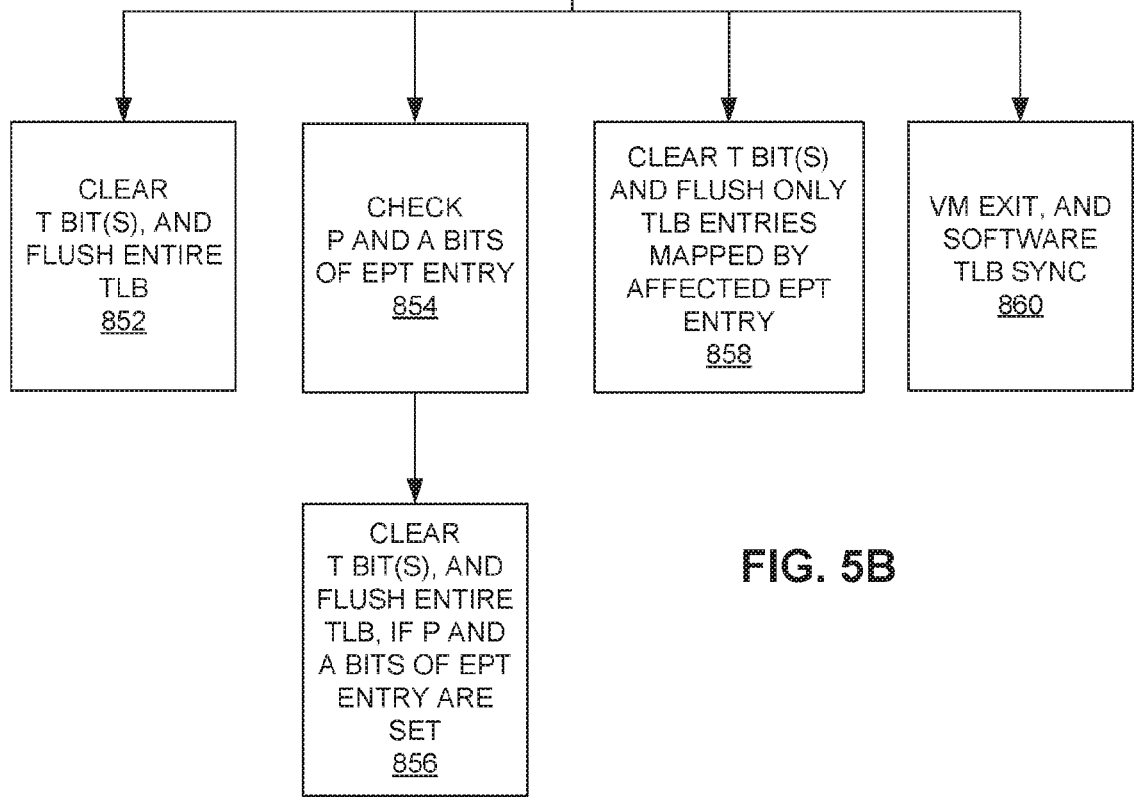

SYNCHRONIZING A TRANSLATION LOOKASIDE BUFFER WITH PAGE TABLES

BACKGROUND

Deterministic replay in a virtual machine creates an execution that is logically equivalent to an original execution of interest. Two executions are logically equivalent if they contain the same set of dynamic instructions, each dynamic instruction computes the same result in the two executions, and the two executions compute the same final state of the system (processor, memory and devices). Virtual machines are software abstractions of physical computer systems, generally using virtualization software, which is typically a thin layer of software that logically sits, and provides an interface, between hardware and a guest Operating System (OS). Virtualization is well known to those in the field of computer science. Some virtualization functionality, however, has recently been implemented in hardware, including in recent microprocessor designs (as described further below) and in recent input/output (I/O) devices. Accordingly, the term "virtualization software" may be replaced by the term "virtualization logic" to encompass implementations involving any combination of software and/or hardware virtualization functionality. The term "virtualization software" will be primarily used throughout the following description, but this usage should not be understood as a limitation on the scope of the invention.

A virtual machine-based deterministic replayer may support full-system replay; i.e., the entire virtual machine (VM), including guest operating system (OS) and guest applications, is recorded and replayed. During recording, all sources of non-determinism from outside the virtual machine are captured and logged in a log file. These include data and timing of inputs to all devices, including virtual disks, virtual network interface cards (NICs), etc. A combination of techniques, such as device emulation and binary translation, are used to ensure deterministic replay as long as the recorded device input data are replayed at the right times.

Certain central processor unit (CPU) instructions are non-deterministic. A non-deterministic instruction is one whose output is not determined entirely by its inputs or a current architectural state. For example, the x86 RDTSC instruction returns the current time expressed in processor clocks, RDPMC and RDMSR return the contents of performance counter registers, etc. Thus, the outputs of non-deterministic instructions can arise from the interaction of the VM with a non-deterministic unit such as a real time clock, which is a device that can be queried by a CPU with a RDTSC instruction, whose result is returned in real-time and depends on when the instruction is executed. Examples of other non-deterministic units include input devices (such as a keyboard, mouse, microphone, etc.) a thermal sensor, a transducer, a network card, a video camera, and so on. Such devices are non-deterministic because they produce inputs that cannot be predicted based solely on the state of the machine.

When executing application(s) within a VM, the virtualization software can record the complete execution behavior. Having saved this behavioral information, the user can replay that exact and complete behavior an unlimited number of times. This can be useful for debugging. For example, a user can record execution of the VM, and then attach a gdb debugger to the guest operating system or guest applications during replay. On replay, the user can look at memory, set breakpoints, and single step through the execution to identify problems and resolve them. Of course, record and replay have other applications too, any of which may benefit from the embodiments described herein.

Record and replay techniques may also be used to provide fault tolerance capabilities in a virtualized computer system, so that the virtualized computer system may continue to operate properly in the event of a failure in hardware, virtualization software or host software. One way of providing fault tolerance is to run two virtual machines (a "primary" virtual machine, and a "backup" or "secondary" virtual machine) in near lockstep.

FIG. 1 illustrates a method of providing fault tolerance by record and replay, using a backup VM supporting the primary VM. A primary VM 200-1 is the "real" VM that is actually communicating externally of the virtualized computer system. A backup VM 200-2 is configured to take over almost instantaneously if primary host 100-1 or primary VM 200-1 fails.

The primary VM 200-1 runs at least one VCPU 210-1 and the guest OS 220-1, supported by virtualization software, which may comprise a hypervisor 601-1 including a VMM (Virtual Machine Monitor) 300-1 and a VMkernel 600-1, on host system hardware 100-1 supporting a virtual disk 240-1. The secondary VM 200-2 also runs at least one VCPU 210-2 and the guest OS 220-2, also supported by virtualization software, which may comprise a hypervisor 601-2 including a VMM 300-2 and a VMkernel 600-2, on host system hardware 100-2 supporting a virtual disk 240-2. FIG. 1 shows a separate virtual disk 240-1, 240-2 for each VM 200-1, 200-2 for purposes of illustration, however, the primary VM 200-1 and secondary VM 200-2 in a fault tolerance configuration may share a common virtual disk, which may be managed and modified exclusively by the primary VM 200-1 until the secondary VM 200-2 takes over in the event of a failure of the primary VM 200-1. While the virtualized computer system illustrated in FIG. 1 includes virtualization software comprising a hypervisor, which further comprises a VMkernel and a VMM, this invention may be implemented in a wide variety of virtualized computer systems having a wide variety of configurations of virtualization software or virtualization logic, as described in the prior art, including, in particular, earlier-filed patents and patent applications assigned to VMware, Inc., the assignee of this patent application. For the purposes of this disclosure, any action performed by the VMkernels 600-1, 600-2 may be considered to be performed by virtualization software or virtualization logic in a broader sense, such as by the hypervisors 601-1, 601-2.

One way of keeping the two VMs 200-1, 200-2 in near lockstep for fault tolerance is to record (log) all non-deterministic inputs or events encountered by the primary VM 200-1 in log entries 280 and send the log entries 280 to the backup VM 200-2. The VMM 300-1 corresponding to the primary VM 200-1 records such logs and the VMkernel 600-1 sends the log entries 280 to the VMkernel 600-2 corresponding to the secondary VM 200-2. Non-deterministic inputs/events include, for example, (i) all inputs from the network external to the virtualized computer system, (ii) information regarding when virtual interrupts were delivered to the VCPU 210-1 due to external events, (iii) timer interrupts delivered to the VCPU 210-1, and (iv) timestamps delivered to the VCPU 210-1 when the VCPU 210-1 acquires the current time via various hardware functionality. The VMM 300-2 corresponding to the backup VM 200-2 then uses the log entries 280 to ensure that the backup VM 200-2 executes exactly the same instruction stream as the primary VM 200-1 (i.e., the backup VM 200-2 replays the log 280). The VMkernel 600-2 corresponding to the secondary VM 200-2 sends acknowledgments (ACK) 282 back to the VMkernel 600-1 corresponding to the primary VM 200-1, indicating which log entries 280 have been received at the secondary VM 200-2 and which log entries 280 have been replayed on the secondary VM 200-2.

Deterministic replay by the backup VM 200-2 requires that the replay on the backup VM 200-2 behave substantially the same during logging and replaying phases. However, the memory management unit (MMU) of modern CPUs may be a source of non-determinism. In particular, MMUs of modern CPUs that include hardware support for processor (CPU) virtualization may be a source of non-determinism. Both Intel Corporation and Advanced Micro Devices, Inc. have introduced processor designs with hardware support for processor virtualization. Support in Intel processor designs is typically promoted as Intel Virtualization Technology (Intel VT-x) and was formerly known by the code-name "Vanderpool," while support in AMD designs is typically promoted as AMD Virtualization (AMD-V) or Secure Virtual Machine (SVM) technology and was at one time known by the code-name "Pacifica." Persons of ordinary skill in the art will generally be familiar with both AMD and Intel designs for hardware-assisted virtualization, which are detailed in published design documents such as Advanced Micro Devices, Inc., AMD64 Virtualization Codenamed "Pacifica" Technology: Secure Virtual Machine Architecture Reference Manual (2005) and Intel Corporation, Intel® Virtualization Technology Specification for the IA-32 Intel® Architecture (2005). Despite some apparent differences in terminology, persons of ordinary skill in the art will appreciate the substantial similarity of AMD and Intel hardware-assistance techniques. Among other possible uses, embodiments of this invention may be used to enable deterministic replay in a virtualized computer system having such modern CPUs. This patent describes the invention(s) in relation to these specific Intel and AMD processor designs, although the invention(s) may also be implemented in connection with other processor designs. Thus, more specifically, the memory management unit (MMU) of modern CPUs (e.g., Intel VT-x or AMD-V CPUs) may use in-memory data structures (e.g., Nested Page Tables (NPT) or Extended Page Tables (EPT)) as well as on-the-chip data structures (e.g., Translation Lookaside Buffers (TLB)) for caching accessed entries of the in-memory data structures. The TLB may provide a source of non-determinism, as will be explained in more detail below.

FIG. 2A illustrates generally how a linear page number (LPN) 406 is translated to a machine page number (MPN) 410 by a MMU 450 in a modern CPU 110. LPN 406 is the virtual address page number used by guest OS 220 (and guest applications executing on the guest OS 220) to access virtual memory. LPN 406 is translated to a physical page number (PPN) 408, using guest page table 402 maintained by guest OS 220. The PPN 408 is a physical page number from the perspective of guest OS 220. However, in order to access the actual system memory, PPN 408 is generally translated to a machine page number (MPN) 410 in virtualized computer systems. Prior patents and applications assigned to VMware describe methods that may be used by virtualization software to translate guest "physical" addresses specified by a guest OS (e.g. PPN 408) to machine addresses (e.g. MPN 410) that can be used to access actual physical memory. These prior patents and applications describe "shadow page tables" generated by virtualization software and used by a MMU to translate guest virtual addresses (e.g. LPN 406) into machine addresses (e.g. MPN 410). In some modern CPUs 110, however, the MMU 450 can translate the LPN 406 to a MPN 410 using guest page table 402 along with NPT or EPT 404. NPT or EPT 404 is typically maintained by virtualization software, such as VMM 300. As described in existing literature and as known in the art, the MMU 450 may retain a limited number of various mappings, including mappings from LPN 406 to PPN 408 and mappings from LPN 406 to MPN 410, among others, in a TLB 454 and in paging structure caches 456, to improve memory access times. In general terms, when translating a LPN 406 to a MPN 410, MMU 450 typically first looks in TLB 454 for the required mapping. If a valid mapping from LPN 406 to MPN 410 is found, the cached mapping is generally used, and the MMU 450 generally does not need to use the guest page table 402 or the NPT or EPT 404 to determine the appropriate translation. If a valid mapping from LPN 406 to MPN 410 is not found, however, the MMU 450 must generally perform a page table walk to determine the translation. Such a page table walk is described below in connection with FIGS. 2B and 2C.

Prior patents and applications assigned to VMware have used the terms GVPN (Guest Virtual Page Number), GPPN (Guest Physical Page Number) and PPN (Physical Page Number) in describing address translations in virtualized computer systems. LPN, as used in this patent, is analogous to GVPN, as used in some prior VMware patents; PPN, as used in this patent, is analogous to GPPN, as used in some prior VMware patents; and MPN, as used in this patent, is analogous to PPN, as used in some prior VMware patents.

FIG. 2B illustrates in greater detail how the MMU 450 performs a page table walk on the guest page table 402, according to one configuration, to translate from LPN 406 to PPN 408, and further uses NPT or EPT 404 to translate from PPN 408 to MPN 410. For purposes of this patent, a translation from LPN 406 to PPN 408 will be referred to as a "guest translation," while a translation from PPN 408 to MPN 410 will be referred to as a "host translation." Although the terminology used by Intel for guest page tables and EPT and the terminology used by AMD for guest page tables and NPT is different, the structure and use of these page tables are substantially similar, and, although the following description uses terminology from Intel literature, a person of skill in the art will also understand the structure and process as they relate to AMD CPUs, as well as other possible hardware-assist CPUs. FIG. 2B shows a 3-level structure for guest page table 402, although structures having different numbers of levels are also possible. A person of skill in the art will understand other possible structures and their use, based on existing literature, including, in particular, relevant literature from Intel and AMD. Thus, guest page table 402 comprises a page directory 402-1, a page table 402-3 and a page frame 402-5. Actually, as is well known, virtualized computer systems typically comprise numerous guest page tables 402, each with its own page directory 402-1, and each guest page table 402 typically comprises a plurality of page tables 402-3 and a plurality of page frames 402-5, however, for simplicity, FIG. 2B shows only the page directory, page table and page frame involved in a current address translation. The page directories 402-1 and the page tables 402-3 are referred to collectively herein as "guest page table pages," while the page frames 402-5 are referred to herein as "guest data pages."

As also shown in FIG. 2B, linear address 406A comprises a directory value 406-1, a table value 406-2 and an offset value 406-3. LPN 406 comprises the directory value 406-1 and the table value 406-2. Along with guest page table 402, control register CR3 412 is also maintained by guest OS 220. CR3 412 specifies a base address for page directory 402-1 in the form of a PPN (or in the form of a physical address, depending on the paging mode). MMU 450 performs a host translation 409-1 to translate this PPN into MPN 410-1 using NPT/EPT 404. The structure of NPT/EPT 404 and the process for its use in translating from PPN to MPN is described below in connection with FIG. 2C. MPN 410-1 specifies the base address of page directory 402-1 in terms of a machine address. The directory value 406-1 is then used as an index into page directory 402-1 to select page directory entry 402-2. Entry 402-2 specifies the base address for page table 402-3 again in the form of a PPN. MMU 450 performs another host translation 409-2 to translate this PPN into MPN 410-2 using NPT/EPT 404. MPN 410-2 specifies the base address of page table 402-3 in terms of a machine address. The table value 406-2 is then used as an index into page table 402-3 to select page table entry 402-4. Entry 402-4 specifies the base address for page frame 402-5 again in the form of a PPN. MMU 450 performs another host translation 409-3 to translate this PPN into MPN 410-3 using NPT/EPT 404. MPN 410-3 specifies the base address of page frame 402-5 in terms of a machine address. Page frame 402-5 includes the memory location for the memory access. The actual machine address (MA) 402-6 for the memory access is determined by adding the offset 406-3 to MPN 410-3.

FIG. 2C illustrates in greater detail how the MMU 450 uses the NPT or EPT 404, according to one configuration, to perform a host translation, such as the host translations 409-1, 409-2 and 409-3, translating from PPN 408 to MPN 410. FIG. 2C shows a 4-level structure for NPT/EPT 404, although structures having different numbers of levels are also possible. A person of skill in the art will understand other possible structures and their use, based on existing literature, including, in particular, relevant literature from Intel and AMD. Thus, NPT/EPT 404 comprises a PML4 table 404-1, a page directory pointer table 404-3, a page directory 404-5 and a page table 404-7. At the same time, guest physical address 408A comprises an upper portion 408-1 that is not used for translating to MPN, a PML4 value 408-2, a directory pointer value 408-3, a directory value 408-4, a table value 408-5 and an offset value 408-6. PPN 408 comprises the PML4 value 408-2, the directory pointer value 408-3, the directory value 408-4 and the table value 408-5. Along with NPT/EPT 404, Virtual Machine Control Structure (VMCS) 413 is also maintained by VMM 300. VMCS 413 includes EPT PTR 413-1, which specifies a machine base address for PML4 table 404-1. The PML4 value 408-2 is then used as an index into PML4 table 404-1 to select PML4 table entry 404-2. The entry 404-2 specifies a machine base address for page directory pointer table 404-3. The directory pointer value 408-3 is then used as an index into page directory pointer table 404-3 to select page directory pointer table entry 404-4. Entry 404-4 specifies the machine base address for page directory 404-5. The directory value 408-4 is then used as an index into page directory 404-5 to select page directory entry 404-6. The entry 404-6 specifies a machine base address for page table 404-7. The table value 408-5 is then used as an index into page table 404-7 to select page table entry 404-8. Entry 404-8 specifies MPN 410 corresponding to PPN 408.

As mentioned above, MMU 450 generally stores recently used mappings related to guest page table 402 and NPT/EPT 404 in TLB 454 and in paging structure caches 456 to speed up subsequent memory accesses. Different types of mappings may be stored in TLB 454 and caches 456, as described in existing literature, including, in particular, relevant literature from Intel and AMD. For example, recent mappings from LPN 406 to PPN 408 and recent mappings from LPN 406 to MPN 410 may be stored in TLB 454, while recent mappings from PPN 408 to MPN 410 and recent mappings from PML4 value 408-2 to the contents of PML4 table entry 404-2 may be stored in caches 456. If the guest OS 220 makes changes to guest page table 402 and/or the VMM 300 makes changes to NPT/EPT 404, one or more of the mappings stored in TLB 454 and caches 456 may become stale relative to the corresponding mappings in guest page table 402 and/or NPT/EPT 404. Inconsistencies can arise between the mappings in guest page table 402 and NPT/EPT 404 on one hand and the cached mappings in TLB 454 and caches 456 on the other hand. Such inconsistencies can give rise to non-determinism. Software generally cannot determine exactly which mappings are stored in TLB 454 and caches 456 because mappings can be stored and/or evicted by unpredictable means. For example, mappings can be evicted from TLB 454 due to capacity evictions, System Management Interrupts and speculative TLB prefetches. Thus, the mapping used for a memory access can depend on whether a particular mapping has been stored or evicted from TLB 454 or caches 456. Suppose for example, MMU 450 stores a mapping from a first LPN to a first MPN in TLB 454, based on the mappings in guest page table 402 and NPT/EPT 404. Next, suppose that guest OS 220 changes guest page table 402, so that the first LPN should now map to a second MPN. Suppose next that there is a memory access to the first LPN before any TLB flush (or relevant TLB invalidation). The mapping used by MMU 450 for this memory access to the first LPN will depend on whether or not the mapping from the first LPN to the first MPN has been evicted from TLB 454. If the mapping has not been evicted, then MMU 450 will generally map the first LPN to the first MPN based on the cached mapping, while, if the mapping has been evicted, the MMU 450 will walk the guest page table 402 and determine that the first LPN should map to the second MPN.

The VMM 300 can eliminate any possible non-determinism resulting from changes it makes to NPT/EPT 404 by flushing the TLB 454 and/or the caches 456, and/or by invalidating entries in the TLB 454 and/or the caches 456. A person of skill in the art will understand how to do this, based on existing literature, including, in particular, relevant literature from Intel and AMD.

In some existing virtualized computer systems, the VMM 300 can also eliminate any possible non-determinism resulting from changes the guest OS 220 makes to the guest page table 402. In existing virtualization products from VMware, for example, the VMM 300 can place traces on all physical memory pages that constitute the guest page table 402. Traces are described in earlier patents owned by VMware. If the guest OS 220 attempts to write to the guest page table 402, the VMM 300 is activated and alerted to the attempted write. The VMM 300 may allow the attempted write to take place, but then the VMM 300 can also eliminate any possible non-determinism by flushing the TLB 454 and/or the caches 456, and/or by invalidating appropriate entries in the TLB 454 and/or the caches 456.

However, to fully take advantage of efficiencies of the modern CPUs described above, the VMM 300 preferably does not place traces on the physical memory pages containing the guest page table 402. Instead, the VMM 300 should allow the guest OS 220 to write to the guest page table 402, without any such traces. In this case, however, the VMM 300 generally cannot eliminate all possible non-determinism resulting from changes to the guest page table 402 by the guest OS 220.

SUMMARY

Embodiments of the present disclosure include a method and a processor performing a method for keeping cached address translation mappings (such as in a TLB) in synchronization with guest translation tables. A flag bit or indicator bit referred to herein as a "T" bit may be added to NPT/EPT entries. The T bits are set for NPT/EPT entries that map to memory pages containing the guest translation tables. When modifications are made to pages mapped with NPT/EPT entries with the T bit set, changes to the cached address translation mappings are made so that the cached address translation mappings remain in synchronization with the pages mapped with these NPT/EPT entries. These T bits may be set during guest page table walks, for example. In other embodiments, other means may be employed for determining cached address translation mappings that map to guest translation tables. Also, the invention may be implemented in other systems that do not include NPT/EPT entries.

BRIEF DESCRIPTION OF THE DRAWINGS

The teachings of the embodiments of the present disclosure can be readily understood by considering the following detailed description in conjunction with the accompanying drawings.

FIG. 4B illustrates a plurality of different options available for preparing the TLB to detect a subsequent attempt to write to a guest page table page.

FIG. 5B illustrates a plurality of different options available for synchronizing the TLB with the guest page table upon detection of an attempted write to a guest page table page.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

The present invention as described herein may be used to advantage in both a hosted and a non-hosted virtualized computer system, regardless of the degree of virtualization, in which the virtual machine(s) have any number of physical and/or logical virtualized processors. The present invention may also be implemented directly in a computer's primary operating system (OS), both where the OS is designed to support virtual machines and where it is not. Moreover, the invention may even be implemented wholly or partially in hardware, for example in processor architectures designed to provide hardware support for virtual machines. The present invention may be implemented as a computer program product including computer instructions configured to perform the methods of the present invention. The computer program can be stored on a computer readable storage medium to run on one or more processors of the virtualized computer system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Figure 1:
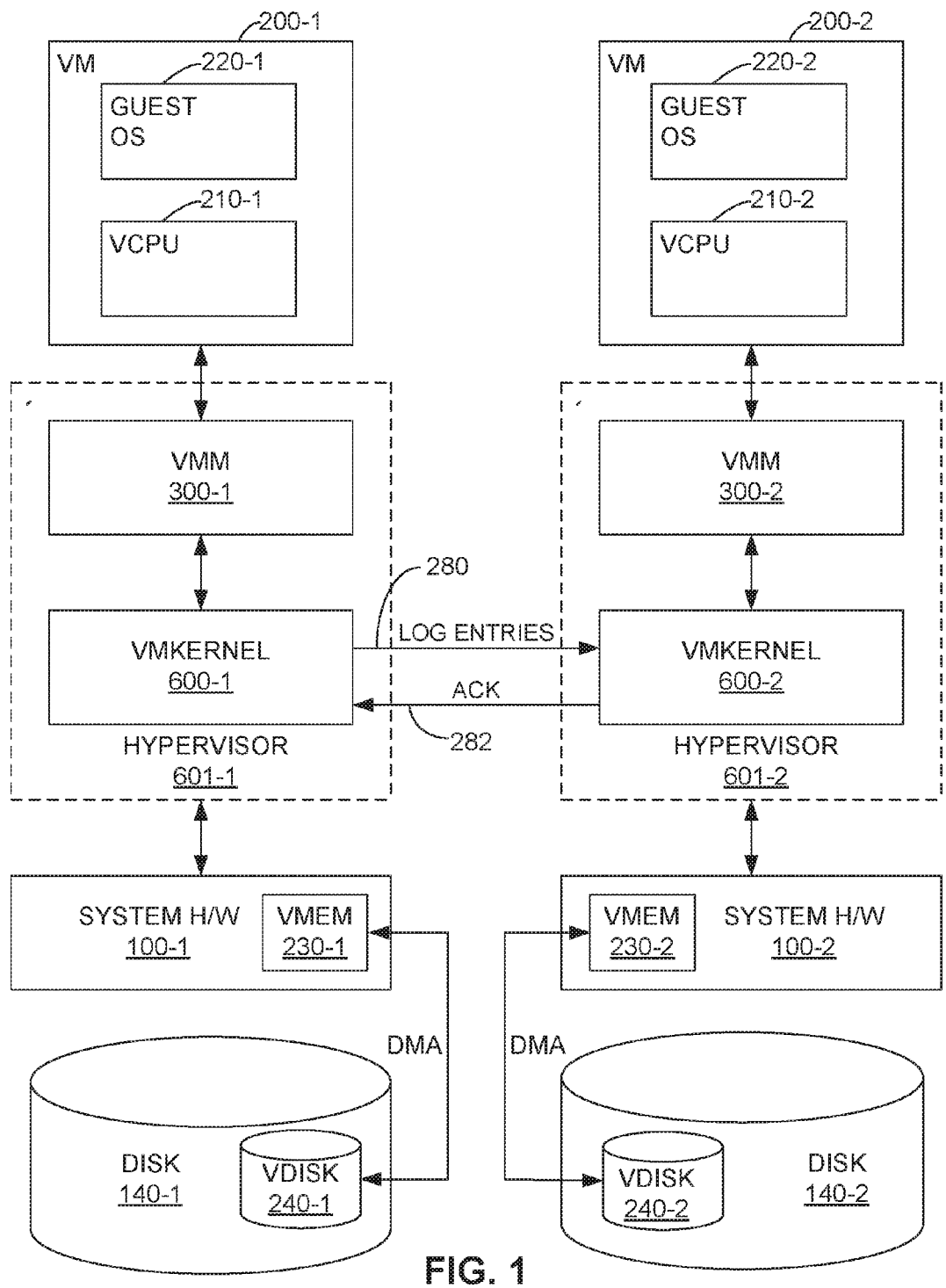
FIG. 1 illustrates a conventional method of providing fault tolerance by record and replay, using a backup VM supporting the primary VM.
Figure 2A:
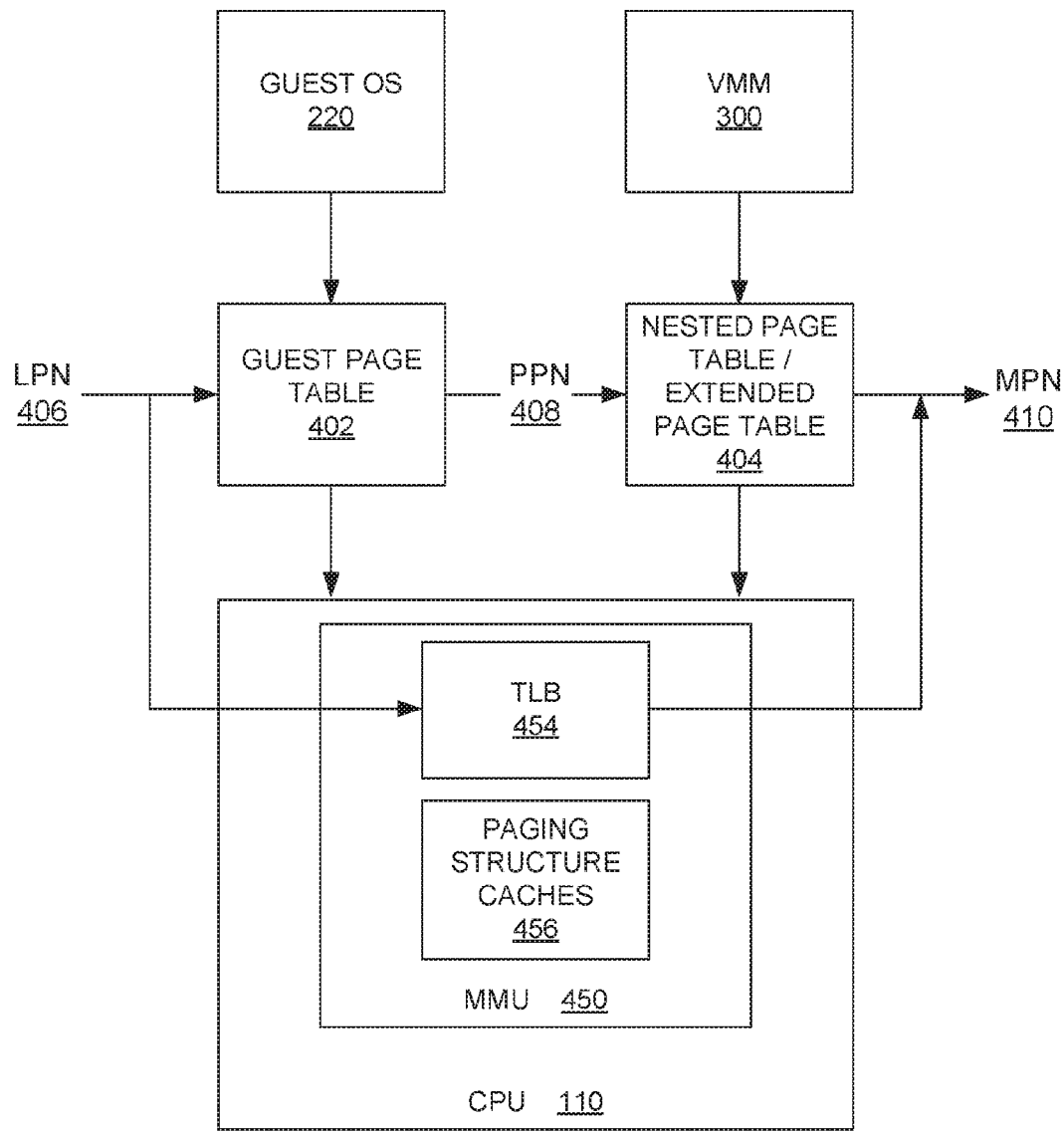
FIG. 2A illustrates how a linear page number (LPN) is translated to a machine page number (MPN) in certain modern CPUs.

At a high level, according to embodiments of the present disclosure, a flag bit or indicator bit referred to herein as a "T" bit is added to the EPT entries. This T bit is set in NPT/EPT entries that map guest page table pages. These T bits may be set when the NPT/EPT is accessed to determine MPNs for guest page table pages during guest page table walks. When modifications are made to guest page table pages, as determined by reference to EPT entries with the T bit set, certain changes to the TLB (or TLB entries mapping the modified guest page table pages) are made so that the TLB remains in synchronization with the modified guest page table pages. In other embodiments, changes may be made to other address translation cache(s), such as the paging structure caches 456 illustrated in FIG. 2A, that contain mappings for modified guest page table pages. Also, in other embodiments, address translation cache entries that map modified guest page table pages may be determined in other ways. In still other embodiments, EPT entries that map guest page table pages may be identified in other ways. Also, in other embodiments, the T bits for EPT entries that map guest page table pages may be set at other times, under different circumstances and/or by different methods. Embodiments of this invention, upon modification of a guest page table page, change one or more cached address translation mappings to achieve synchronization with respect to the modification to the guest page table page.

Figure 3A:
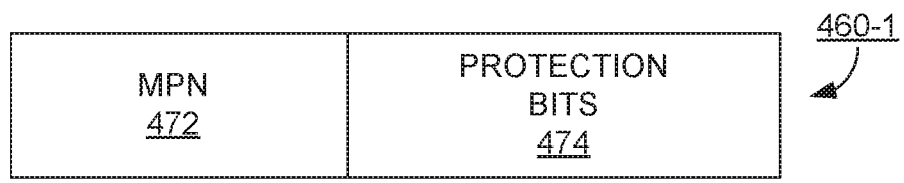
FIG. 3A illustrates the general structure of a conventional EPT entry.

FIG. 3A illustrates the general structure of a conventional EPT entry 460-1. The conventional EPT entry 460-1 includes an MPN 472 and various protection bits 474. MPN 472 may be the base address for a lower level EPT translation structure, or it may be the actual physical page number (MPN) corresponding to a guest physical page number (PPN). Protection bits 474 include a variety of protection bits that may be used to allow or prohibit access to, or associate a variety of characteristics with, the memory page mapped by EPT entry 460-1.

Figure 2B:
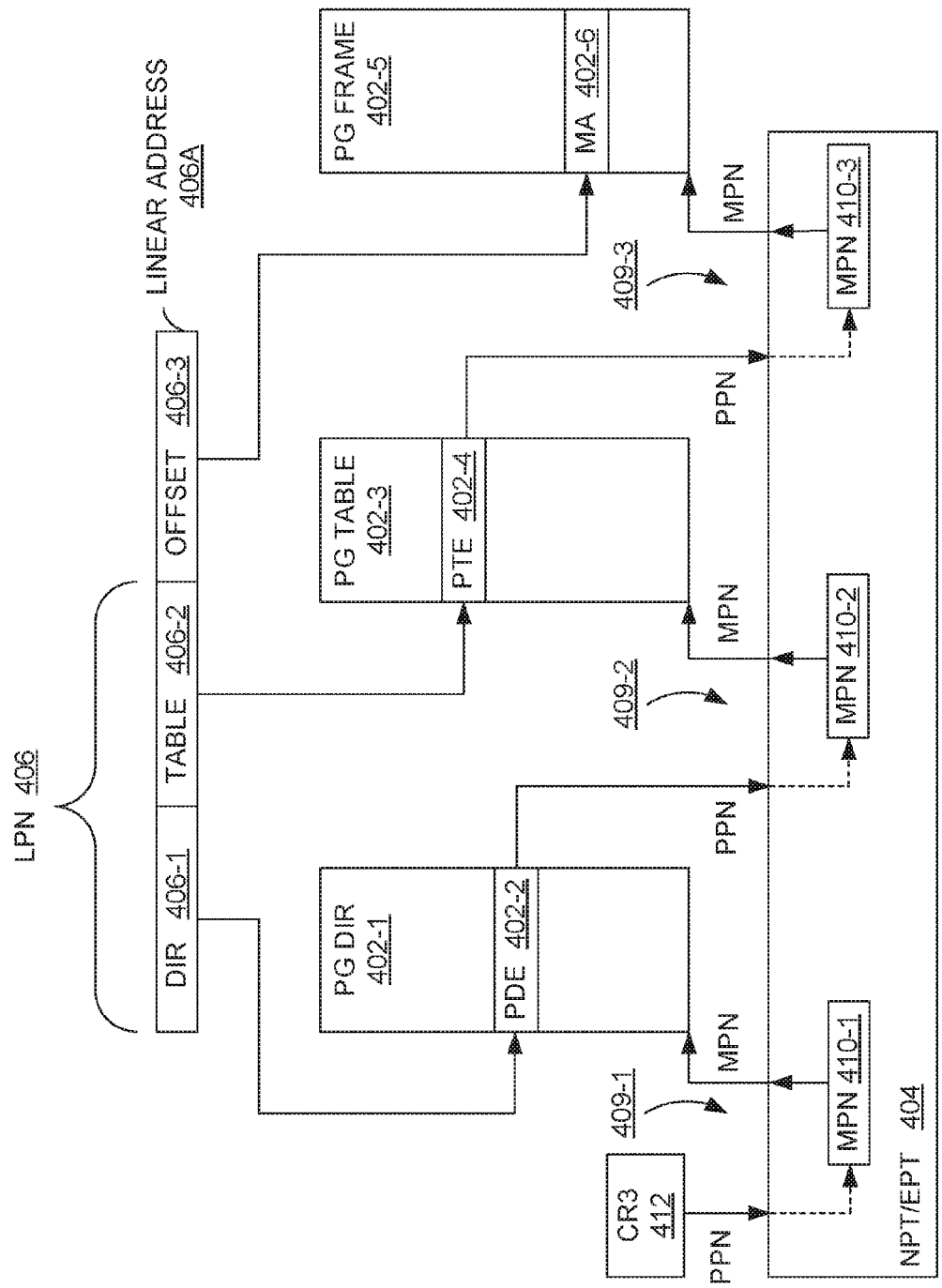
FIG. 2B illustrates the translation from LPN to MPN in certain modern CPUs in greater detail, including the structure and operation of guest page tables.
Figure 2C:
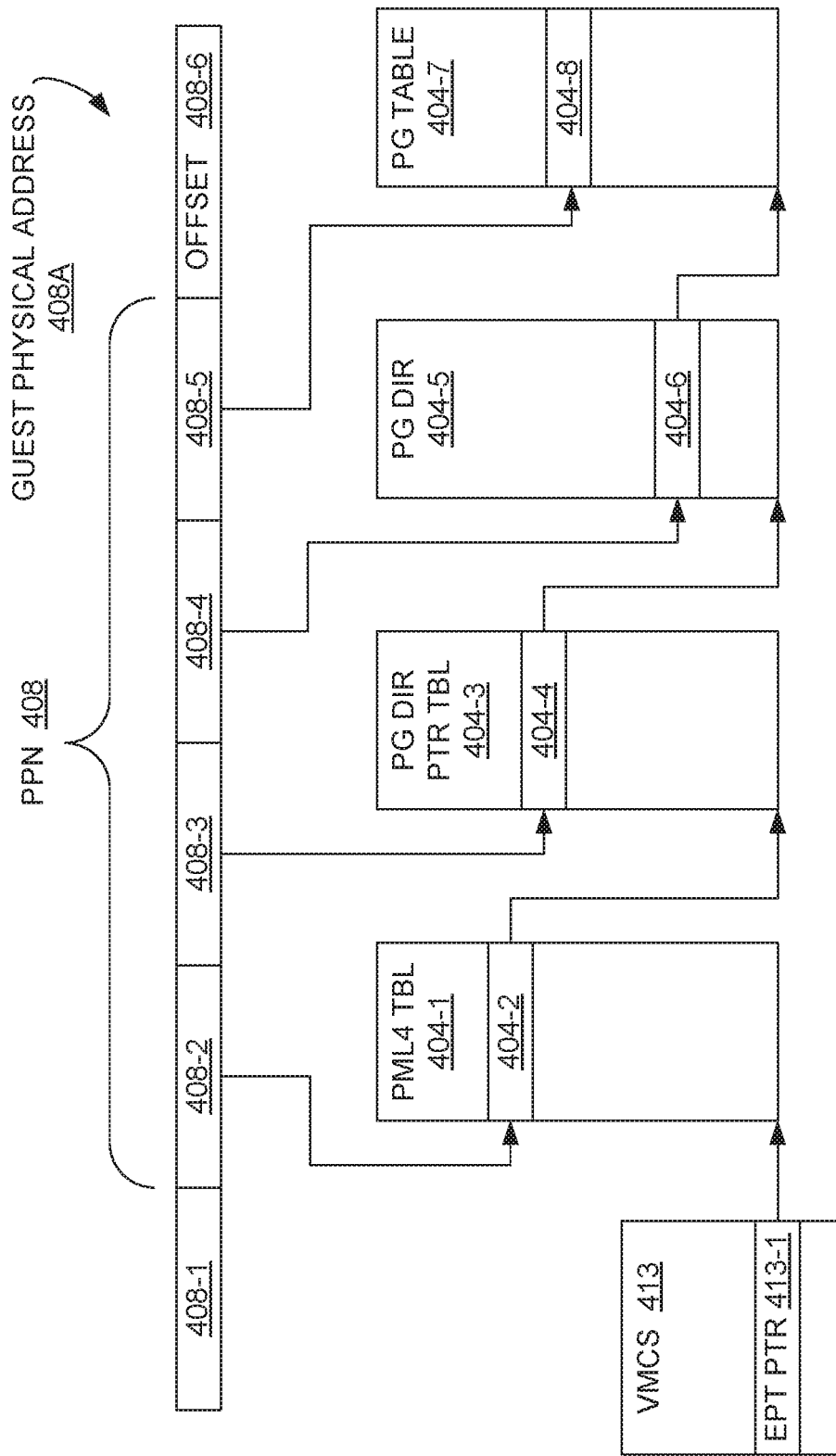
FIG. 2C illustrates the structure and operation of nested page tables or extended page tables for translating from physical page number (PPN) to MPN in certain modern CPUs.
Figure 3B:
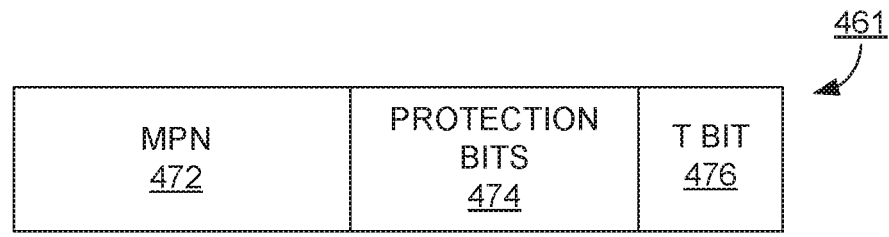
FIG. 3B illustrates the general structure of an EPT entry according to one embodiment.

Turning now to FIG. 3B, this figure illustrates the structure of an EPT entry according to one embodiment. The EPT entry 461 includes a MPN 472 and protection bits 474. Additionally, the EPT entry 461 also includes a flag bit that is referred to herein as the "T bit" 476. The MPN 472 and the protection bits 474 may be the same as in the prior art EPT entry 460-1 illustrated in FIG. 3A. In one embodiment, whenever a guest page table walk is performed, for EPT entries 461 that are accessed to determine the machine base address for a guest page table page, the T bit 476 is set. Thus, for example, referring back to FIG. 2B, during the host translations 409-1 and 409-2, the T bit 476 in the two EPT entries 461 that contain the MPNs 410-1 and 410-2, respectively, are set. Setting the T bits during guest page table walks is generally advantageous because mappings for guest page table pages may be cached in the TLB 454 and/or the paging structure caches 456 during the page table walks, and this technique generally ensures that a mapping for a guest page table page will not be cached without the corresponding T bit being set. Note that the T bits 476 of the NPT/EPT entries 461 that map guest data pages themselves need not be set because changes to the guest data pages do not cause mappings in the TLB 454 and the paging structure caches 456 to become stale. Thus, referring back to FIG. 2B again, during the host translation 409-3, the T bit 476 in the EPT entry 461 that contains the MPN 410-3 is not set during a guest page table walk. Note also that generally only T bit 476 of the "leaf" entry of the EPT 404 is set. Thus, referring back to FIG. 2C, during a host translation that determines the base address of a guest page table page, the T bit 476 of the EPT entry 404-8 is set, while the T bits 476 of the EPT entries 404-2, 404-4 and 404-6 are not set.

Figure 3C:
FIG. 3C illustrates the general structure of a TLB entry according to one embodiment.

In one embodiment, the structure of the hardware TLB 454 is also modified. FIG. 3C illustrates the general structure of a TLB entry according to one embodiment. The TLB entry 454-1 includes a MPN field 484, protection bits 486, and a T bit 488. The T bit 488 corresponds to the T bit 476 in the EPT entry 461. As will be explained in more detail with reference to FIGS. 4A and 4B, for this embodiment, when a LPN to MPN 484 mapping is inserted in the TLB 454, the T bit 476 of the corresponding EPT entry 461 is copied to the T bit 488 of TLB entry 454-1. In this embodiment, the T bit 488 of TLB entry 454-1 is used to detect a write access to a guest page table page, as will be explained in more detail with respect to FIGS. 5A and 5B.

For simplicity, the description below is based on a TLB 454 having entries that map LPNs 406 to MPNs 410, although other TLB configurations are also possible. Also for simplicity, the description below is mostly limited to the TLB 454 and does not describe all actions that would be taken with respect to the paging structure caches 456, as these actions depend on the structure and operation of the paging structure caches 456, which vary between different CPU architectures. However, the same general principals and concepts apply to other configurations for the TLB 454 and to the paging structure caches 456, and, based on the description below, a person of skill in the art will understand how to implement the invention in connection with other configurations for the TLB 454 and with the paging structure caches 456. In the description below, when an action is to be taken with respect to the TLB 454, analogous action(s) should generally also be taken with respect to the paging structure caches 456. For example, if the TLB 454 is flushed, entries in the paging structure caches 456 may also need to be flushed or invalidated.

Figure 4A:
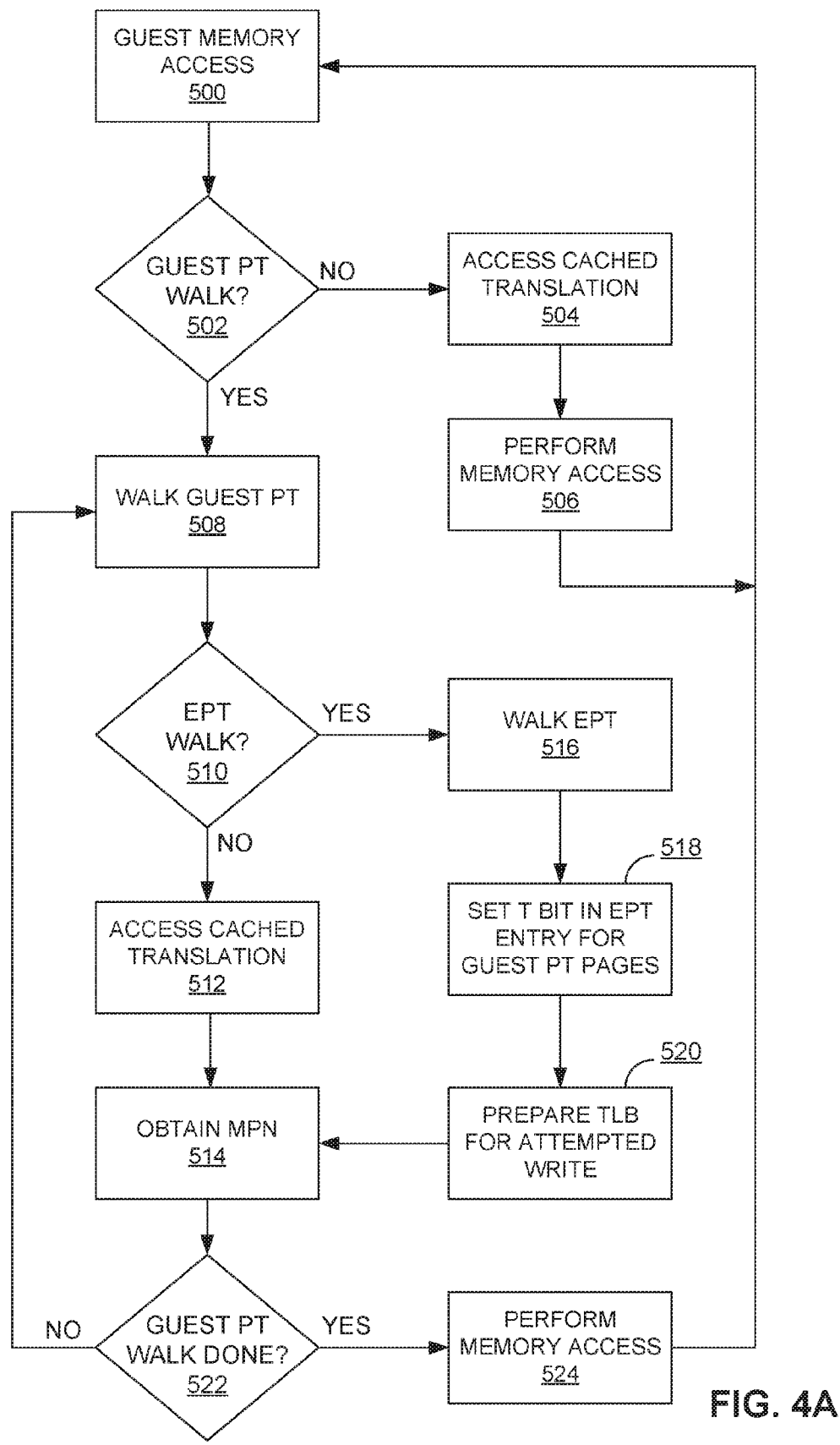
FIG. 4A illustrates relevant aspects of a generalized method for handling a guest memory access, according to one embodiment.

FIG. 4A illustrates relevant aspects of a generalized method for responding to a guest memory access, that is a memory access by the guest OS 220 or applications running on the guest OS 220, using a guest virtual memory address having a LPN 406. The method begins at an initial step 500. Next, at a decision step 502, the MMU 450 determines whether there is a valid mapping for LPN 406 in the TLB 454. If there is a TLB hit, such that a walk of the guest page table 402 is not needed, the method proceeds to a step 504. At step 504, the mapping from LPN 406 to MPN 410 is retrieved from the TLB 454, and the memory access is performed accordingly, at a step 506. After the step 506, the method of FIG. 4A returns to the step 500.

If a guest page table walk is needed, the method of FIG. 4A proceeds from step 502 to step 508. At step 508, the guest page table walk is performed, as described above in connection with FIG. 2B. During the guest page table walk, it is determined, at a step 510, whether one or more walks of the EPT 404 are needed. A walk of the EPT 404 may be necessary for any or all of the host translations 409-1, 409-2, 409-3. Thus, step 510 is effectively performed once for each of the host translations 409-1, 409-2, 409-3. If a walk of the EPT 404 is not needed for a host translation, such as because there is a valid mapping for a needed translation from PPN 408 to MPN 410 in the paging structure caches 456, then the method of FIG. 4A proceeds to a step 512. Otherwise, the method of FIG. 4A proceeds to a step 516. At the step 512, a cached translation from PPN 408 to MPN 410 is accessed, such as from the paging structure caches 456, and the MPN 410 is obtained at a step 514.

At step 516, a walk of the EPT 404 is performed, as described above in connection with FIG. 2C. In one embodiment, if the host translation is to determine a base address for a guest page table page, such as one of the host translations 409-1 or 409-2 of FIG. 2B, then for the leaf EPT entry 461 (e.g., referring to FIG. 2C, for the EPT entry 404-8, but not for the EPT entries 404-2, 404-4, 404-6) the T bit 476 is set at step 518. Also in one embodiment, again if the host translation is to determine a base address for a guest page table page, then something is done to prepare the TLB 454 to handle a subsequent write to the same guest page table page. The action taken in step 520 depends on the particular embodiment and implementation. Several possible actions that may be taken at step 520 are described below in connection with FIG. 4B. After the step 520, the method of FIG. 4A proceeds to step 514, and a MPN is obtained from the walk of the EPT 404. After step 514, the method of FIG. 4A proceeds to a step 522, and, if the guest page table walk is not complete, the method returns to step 508 to continue the guest page table, while, if the guest page table walk is complete, the method proceeds to step 524. At step 524, the guest memory access is performed, using the MPN 410 determined through the guest page table walk, including possible walk(s) of the EPT 404. After step 524, the method of FIG. 4A returns to step 500.

FIG. 4B illustrates a plurality of options 702, 704, 706, 708 and 710 for preparing the TLB 454 to handle attempted memory writes to guest page table pages, as shown at step 520 of FIG. 4A. Each of the options illustrated in FIG. 4B prepares the TLB 454 to detect subsequent attempts to write to a guest page table page, so that some other action can be taken to synchronize the TLB 454 with the guest page table 402. Other options for preparing the TLB 454 to respond to an attempted memory write to a guest page table page may also be possible, depending on the architecture, the configuration and the implementation.

As described above, step 520 of FIG. 4A is performed when, during a guest page table walk, a host translation is needed for a base address for a guest page table page. The options illustrated in FIG. 4B prepare the TLB 454 for detecting a subsequent write to the guest page table page for which the host translation is performed. A first option 702 for preparing the TLB 454 for subsequent write(s) to the guest page table page involves marking all TLB entries mapping to the MPN for the base address of the guest page table page as read only (R/O), so that subsequent attempts to write to the guest page table page will result in a permissions mismatch, leading to a guest page table walk. This step can be accomplished by iterating over all TLB entries and downgrading permissions of all entries that map to the MPN, for example. This step can be accomplished more easily if the TLB is made addressable by MPN, in addition to LPN. Of course, some of the mappings in the TLB 454 will subsequently be evicted and new mappings will be loaded into the TLB 454, which may not be marked as R/O, but each time a mapping to a guest page table page is loaded into the TLB 454 all the entries will again be marked as R/O. This ensures that whenever an attempt is made to write to a guest page table page there will either be no valid mapping to the guest page table page in the TLB 454, or any such mapping will be R/O.

Another option 704 for preparing the TLB 454 for subsequent write(s) to the guest page table page involves flushing the entire TLB 454. Still another option 706 involves setting the T bit 488 in the modified TLB entry 454-1 illustrated in FIG. 3C for all TLB entries 454-1 that map to the MPN for the base address of the guest page table page. Still another option 708 involves making all the entries in the TLB 454 read only (R/O). Still another option 710 may be used if A (Access) and D (Dirty) bits are implemented in the EPT. In such an implementation, MMU 450 sets the A bit of an EPT entry when walking the EPT for both read and write accesses, and MMU 450 sets the D bit of the EPT entry when walking the EPT for a write access. Thus, TLB 454 cannot contain a writable copy of an EPT entry unless both the A and D bits are set. Under option 710, the virtualization software invalidates any relevant entries in the TLB 454 any time it clears an A or D bit of an EPT entry that maps a guest page table page. And option 710 also involves flushing the TLB 454, but only if the A and D bits of the EPT entry were already set before the T bit is set in step 518. This way, the TLB 454 cannot contain a valid entry mapping to the guest page table page, unless the A and D bits of the EPT entry are set, and so there is no need to flush the TLB 454, unless those bits are set. Instead of flushing TLB 454, as in option 704, option 710 can alternatively be implemented along with marking TLB entries as R/O, as in options 702 and 708, or along with setting T bit 488 in modified TLB entry 454-1, as in option 706. Thus, option 710 can be viewed generally as an option to skip TLB preparation steps if the respective A and D bits are not set.

Figure 5A:
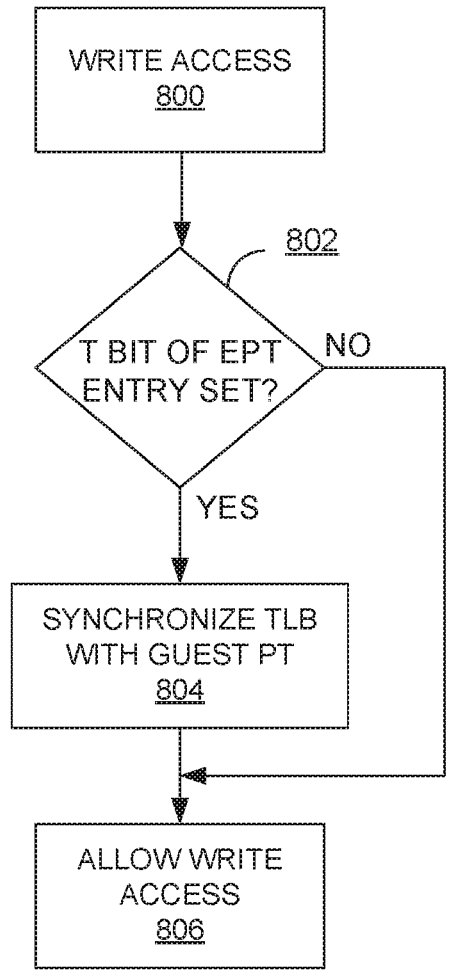
FIG. 5A illustrates relevant aspects of a generalized method for responding to an attempted write access, according to one embodiment.

FIG. 5A illustrates relevant aspects of a generalized method for MMU 450 to respond to an attempted write to memory, according to one embodiment. The method begins at a step 800. At a step 802, MMU 450 determines whether the T bit 476 of a leaf EPT entry 461 involved in a host address translation is set. The way this step is performed depends on the particular embodiment and the implementation. In particular, it depends on how the TLB 454 is prepared for subsequent writes to a guest page table page. As described above, FIG. 4B illustrates several options for preparing the TLB 454 for a subsequent write to a guest page table page.

If option 702 or option 708 is used in implementing step 520 of FIG. 4A, then a subsequent write to a guest page table page will result in a TLB miss or a mismatch in permissions, as any TLB entry that maps to the guest page table page will be marked R/O. Similarly, if option 704 or option 710 is used in implementing step 520, then a subsequent write to a guest page table page will result in a TLB miss, as any TLB entry that maps to the guest page table page will have been flushed from the TLB 454.

During the subsequent guest page table walk, MMU 450 should also perform a walk of EPT 404. Depending on the CPU architecture, an EPT walk may automatically occur without any other actions or modifications. For other possible architectures, however, the MMU 450 might not perform an EPT walk in some circumstances. For example, in some architectures, the TLB 454 or the paging structure caches 456 could contain a mapping from PPN 408 to MPN 410 for the guest page table page, so that even though MMU 450 performs a guest page table walk to translate from LPN 406 to PPN 408, it may use a cached mapping from PPN to MPN, instead of performing an EPT walk. Thus, the TLB 454 and/or the paging structure caches 456 may also need to be prepared, with respect to mappings from PPN to MPN, for subsequent writes to guest page table pages. This step of preparation with respect to PPN to MPN mappings may also be performed at step 520 of FIG. 4A, for example. Further, any or all of the same options described above and illustrated in FIG. 4B could also be used with respect to PPN to MPN mappings, independently of the option used with respect to LPN to MPN mappings. Thus, for example, when all mappings from LPN to MPN in the TLB 454 that map to the guest page table page are marked R/O in step 702 of FIG. 4B, the paging structure caches 456 can be flushed to invalidate any possible mappings from PPN to MPN for the guest page table page.

When MMU 450 performs an EPT walk to determine a MPN for a memory page that is being written to, the MMU 450 reads the T bit 476 of the leaf EPT entry 461. If the T bit 476 is set, the memory page being written to is a guest page table page, and the method of FIG. 5A proceeds to step 804. If the T bit 476 is not set, then the memory page being written to is not a guest page table page, and the method of FIG. 5A skips step 804 and proceeds to step 806.

If option 706 is used in implementing step 520 of FIG. 4A, then a subsequent write to a guest page table page may not result in a TLB miss or a mismatch in permissions. If there is a TLB miss or a mismatch in permissions, then the method of FIG. 5A proceeds as described above, so that when MMU 450 performs an EPT walk to determine a MPN for a memory page that is being written to, the MMU 450 reads the T bit 476 of the leaf EPT entry 461 and the method proceeds accordingly. In the event that there is a TLB hit, however, MMU 450 reads the T bit 488 of the TLB entry 454-1 containing the appropriate mapping, which has the same value as the T bit 476 of the underlying EPT entry 461. The method of FIG. 4A then proceeds to step 804 if the T bit 488 is set, and the method proceeds to step 806 if the T bit 488 is not set.

At step 804, the MMU 450 takes one or more steps to synchronize the TLB 454 with the guest page table 402 with respect to the write to the guest page table page. Several possible actions that may be taken at step 804 are described below in connection with FIG. 5B. At step 806, the attempted write is completed and the method of FIG. 5A ends.

FIG. 5B illustrates a plurality of different options available for synchronizing the TLB 454 with the guest page table 402 when a write access is made to a guest page table page, according to one embodiment. Other options for synchronizing the TLB 454 are also possible. Once modification (write) to a guest page table page is detected, for example, by the method of FIG. 5A, MMU 450 takes corrective action so that the TLB 454 does not fall out of synchronization with the guest page table 402. The various options 852, 854, 856, 858, and 860 illustrated in FIG. 5B are one or more actions that may be taken on the TLB 454 by MMU 450 to deal with this situation. Note that no action needs to be taken on TLB 454 in case of a read access to a guest page table page, because TLB 454 does not become stale (out of synchronization with the guest page table 402) by the read access.

A first option for synchronizing TLB 454 with guest page table 402 involves MMU 450 clearing the T bit 476 of the leaf EPT entry 461 mapping to the guest page table page (e.g., T bit 476 is changed from "1" back to "0") and flushing 852 the entire TLB 454. Flushing the TLB 454 resets the state of TLB 454 so that it does not contain any stale entries. In this embodiment, MMU 450 may choose to clear the T bit(s) 476 of one, several or all of the EPT entries 461. Clearing the T bit 476 of the EPT entries 461 may eliminate unnecessary flushes of the TLB 454 if there is a subsequent write to a guest page table page for which the mapping has already been flushed from the TLB 454.

For a second option, MMU 450 checks 854 the P (Page Table Entry Present) and A (Page Table Entry Accessed) bits of the leaf EPT entry 461 mapping to the guest page table page. The P bit and A bit are part of the protection bits 474 of the EPT entry 461. Then, MMU 450 clears the T bit 476 of the leaf EPT entry 461 and flushes 856 the entire TLB 454, if the P bit and A bit of the EPT entry 461 were set. However, if the EPT entry 461 does not have both its P bit and A bit set, then MMU 450 does not have to perform any corrective action with the TLB 454 because the EPT entry 461 could not have been pre-fetched into the TLB 454. This second option should only be used, however, for CPUs that have A bits in the EPT entries 461, and that have a hardware page walk mechanism that sets A bits in the EPT entries 461 that map page table pages that are accessed during the page walk.

A third option for synchronizing TLB 454 with guest page table 402 involves MMU 450 clearing the T bit 476 of the leaf EPT entry 461 mapping to the guest page table page and flushing 858 only selected entries of TLB 454. Specifically, only entries in TLB 454 that could become stale as a result of the particular write access are flushed or invalidated. The range ("affected range") of linear addresses for which address mappings may be affected by a write to a guest page table page can be determined from (a) the level of the guest page table page to which the write is directed (e.g., for the 3-level structure illustrated in FIG. 2B, a write could be to the page directory level 402-1, to the page table level 402-3 or to the page frame level 402-5), (b) the base linear address mapped by the guest page table page (i.e., the linear address mapped by the entry in the guest page table page corresponding to an index of zero), (c) the offset within the guest page table page to which the write is directed and (d) the size of the modified portion of the guest page table page. A person of skill in the art will understand how to determine the affected range from this information. The offset within the guest page table page to which the write is directed and the size of the modified portion of the guest page table page can be determined directly from the write access, while the level of the guest page table page to which the write is directed and the base linear address mapped by the guest page table page can be determined by other means. For example, the level of the guest page table page to which the write is directed and the base linear address mapped by the guest page table page may be recorded by hardware or software when a T bit 476 in an EPT entry 461 is set, such as at step 518 in FIG. 4A. For this third option, MMU 450 flushes or invalidates 858 only those entries in the TLB 454 that provide mappings for linear addresses within the affected range. Flushing only selected TLB entries may improve system performance.

In a fourth option, CPU 110 causes a VM exit 860 to allow the virtualization software to perform one or more of steps 852, 854-856, and 858 in software rather than by hardware. Additional or alternative actions may also be taken by the virtualization software in response to this VM exit 860.

Upon reading this disclosure, those of skill in the art will appreciate still additional alternative structural and functional designs for maintaining synchronization between the nested page tables/extended page tables and the translation lookaside buffer of the CPU through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A non-transitory computer readable storage medium containing program instructions for maintaining synchronization between an address translation cache of a processor and a guest page table in a virtualized computer system, in which guest software maintains the guest page table containing address translations from guest virtual addresses to guest physical addresses, and virtualization software maintains a second page table containing address translations from guest physical addresses to machine addresses, the processor using the guest page table and the second page table to determine translations from guest virtual addresses to machine addresses, wherein execution of the program instructions by the processor of the virtualized computer system causes the processor to carry out the steps of:

marking entries in the second page table that map to guest page table pages to indicate that the entries map to guest page table pages, wherein the second page table contains address translations from guest physical addresses to machine addresses;

modifying the contents of the address translation cache to ensure that, upon an attempt by guest software to write to a guest page table page, the processor refers to the second page table to determine the machine address of the guest page table page, instead of using a cached address translation to determine the machine address of the guest page table page; and upon a write by guest software to a memory page and as a synchronous programmatic response thereto, if the processor refers to the second page table to determine a machine address for the memory page, determining whether the entry in the second page table that contains the machine address for the memory page indicates that the memory page is a guest page table page, and, if the memory page is a guest page table page, modifying the contents of the address translation cache to eliminate an inconsistency between the address translation cache and the guest page table caused by the write to the guest page table page.

2. The computer readable storage medium of claim 1, wherein the address translation cache is a Translation Lookaside Buffer (TLB).

3. The computer readable storage medium of claim 2, wherein the TLB contains address translations from guest virtual addresses to machine addresses.

4. The computer readable storage medium of claim 1, wherein the second page table is one of an extended page table or a nested page table.

5. The computer readable storage medium of claim 1, wherein the step of marking entries to indicate that the entries map to guest page table pages comprises setting T bits in the entries.

6. The computer readable storage medium of claim 1, wherein the step of marking entries to indicate that the entries map to guest page table pages is performed in conjunction with performing walks of the second page table by a memory management unit of the processor.

7. The computer readable storage medium of claim 1, wherein the step of modifying the contents of the address translation cache to ensure that the processor refers to the second page table to determine the machine address of the guest page table page is performed in conjunction with performing walks of the second page table by a memory management unit of the processor.

8. The computer readable storage medium of claim 1, wherein the step of modifying the contents of the address translation cache to ensure that the processor refers to the second page table to determine the machine address of the guest page table page comprises invalidating one or more entries in the address translation cache.

9. The computer readable storage medium of claim 1, wherein the step of modifying the contents of the address translation cache to ensure that the processor refers to the second page table to determine the machine address of the guest page table page comprises marking one or more entries in the address translation cache as read only.

10. The computer readable storage medium of claim 1, wherein the step of modifying the contents of the address translation cache to eliminate an inconsistency between the address translation cache and the guest page table comprises invalidating one or more entries in the address translation cache.

11. The computer readable storage medium of claim 1, wherein the step of marking entries in the second page table that map to guest page table pages to indicate that the entries map to guest page table pages and the step of modifying the contents of the address translation cache to ensure that the processor refers to the second page table are performed by the processor while not executing the virtualization software.

12. The computer readable storage medium of claim 1, wherein the step of modifying the contents of the address translation cache to eliminate an inconsistency between the address translation cache and the guest page table is performed under the control of the virtualization software.

13. The computer readable storage medium of claim 1, further comprising program instructions causing the processor to carry out the steps of:

upon the write by guest software to the memory page, if the memory page is a guest page table page, clearing one or more of the entries in the second page table that map to the guest page table page so as not to indicate that the entries map to the guest page table page.

14. A computing system, comprising:
a processor having an address translation cache;
guest software executed by the processor and configured to maintain a guest page table containing address translations from guest virtual addresses to guest physical addresses; and
virtualization software executed by the processor and configured to maintain a second page table containing address translations from guest physical addresses to machine addresses;
wherein the processor is configured to use the guest page table and the second page table to determine translations from guest virtual addresses to machine addresses, wherein the processor is further configured to:
mark entries in the second page table that map to guest page table pages to indicate that the entries map to guest page table pages, wherein the second page table contains address translations from guest physical addresses to machine addresses;
modify the contents of the address translation cache to ensure that, upon an attempt by the guest software to write to a guest page table page, the processor refers to the second page table to determine the machine address of the guest page table page, instead of using a cached address translation to determine the machine address of the guest page table page; and
upon a write by the guest software to a memory page and as a synchronous programmatic response thereto, if the processor refers to the second page table to determine a machine address for the memory page, determine whether the entry in the second page table that contains the machine address for the memory page indicates that the memory page is a guest page table page, and, if the memory page is a guest page table page, modify the contents of the address translation cache to eliminate an inconsistency between the address translation cache and the guest page table caused by the write to the guest page table page.

15. The computing system of claim 14, wherein the address translation cache is a Translation Lookaside Buffer (TLB).

16. The computing system of claim 15, wherein the TLB contains address translations from guest virtual addresses to machine addresses.

17. The computing system of claim 14, wherein the second page table is one of an extended page table or a nested page table.

18. The computing system of claim 14, wherein the processor configured to mark the entries to indicate that the entries map to guest page table pages is further configured to set T bits in the entries.

19. The computing system of claim 14, wherein the processor is configured to mark the entries to indicate that the entries map to guest page table pages in conjunction with a memory management unit of the processor performing walks of the second page table.

20. The computing system of claim 14, wherein the processor is configured to modify the contents of the address translation cache to ensure that the processor refers to the second page table to determine the machine address of the guest page table page in conjunction with a memory management unit of the processor performing walks of the second page table.

21. The computing system of claim 14, wherein the processor configured to modify the contents of the address translation cache to ensure that the processor refers to the second page table to determine the machine address of the guest page table page is further configured to invalidate one or more entries in the address translation cache.

22. The computing system of claim 14, wherein the processor configured to modify the contents of the address translation cache to ensure that the processor refers to the second page table to determine the machine address of the guest page table page is further configured to mark one or more entries in the address translation cache as read only.

23. The computing system of claim 14, wherein the processor configured to modify the contents of the address translation cache to eliminate an inconsistency between the address translation cache and the guest page table is further configured to invalidate one or more entries in the address translation cache.

24. The computing system of claim 14, wherein the processor is configured to mark the entries in the second page table that map to guest page table pages to indicate that the entries map to guest page table pages and modify the contents of the address translation cache to ensure that the processor refers to the second page table while not executing the virtualization software.

25. The computing system of claim 14, wherein the processor is configured to modify the contents of the address translation cache to eliminate an inconsistency between the address translation cache and the guest page table under the control of the virtualization software.

26. The computing system of claim 14, wherein the processor is further configured to, upon the write by the guest software to the memory page, if the memory page is a guest page table page, clear one or more of the entries in the second page table that map to the guest page table page so as not to indicate that the entries map to the guest page table page.

27. A non-transitory computer readable storage medium containing program instructions for maintaining synchronization between an address translation cache of a processor and a guest page table in a virtualized computer system, in which guest software maintains the guest page table containing address translations from guest virtual addresses to guest physical addresses, and virtualization software maintains a second page table containing address translations from guest physical addresses to machine addresses, the processor using the guest page table and the second page table to determine translations from guest virtual addresses to machine addresses, wherein execution of the program instructions by the processor of the virtualized computer system causes the processor to carry out the steps of:
   marking entries in the second page table that map to guest page table pages to indicate that the entries map to guest page table pages, wherein the second page table contains address translations from guest physical addresses to machine addresses;
   marking entries in the address translation cache that map to guest page table pages to indicate that the entries map to guest page table pages; and
   upon a write by guest software to a memory page and as a synchronous programmatic response thereto, if the processor refers to the address translation cache to determine a machine address for the memory page, determining whether the entry in the address translation cache that contains the machine address for the memory page indicates that the memory page is a guest page table page, or if the processor refers to the second page table to determine the machine address for the memory page, determining whether the entry in the second page table that contains the machine address for the memory page indicates that the memory page is a guest page table page, and, if the memory page is a guest page table page, modifying the contents of the address translation cache to eliminate an inconsistency between the address translation cache and the guest page table caused by the write to the guest page table page.

28. The computer readable storage medium of claim 27, wherein the steps of marking entries in the second page table and in the address translation cache to indicate that the entries map to guest page table pages are performed in conjunction with performing walks of the second page table by a memory management unit of the processor.

29. The computer readable storage medium of claim 27, wherein the steps of marking entries in the second page table and in the address translation cache to indicate that the entries map to guest page table pages are performed by the processor while not executing the virtualization software, and the step of modifying the contents of the address translation cache to eliminate an inconsistency between the address translation cache and the guest page table is performed under the control of the virtualization software.

30. The computer readable storage medium of claim 27, further comprising program instructions causing the processor to carry out the step of:
   upon the write by guest software to the memory page, if the memory page is a guest page table page, clearing one or more of the entries in the second page table that map to the guest page table page so as not to indicate that the entries map to the guest page table page.

31. A computing system, comprising:
   a processor having an address translation cache;
   guest software executed by the processor and configured to maintain a guest page table containing address translations from guest virtual addresses to guest physical addresses; and
   virtualization software executed by the processor and configured to maintain a second page table containing address translations from guest physical addresses to machine addresses;
   wherein the processor is configured to use the guest page table and the second page table to determine translations from guest virtual addresses to machine addresses, wherein the processor is further configured to:
      mark entries in the second page table that map to guest page table pages to indicate that the entries map to guest page table pages, wherein the second page table contains address translations from guest physical addresses to machine addresses;
      mark entries in the address translation cache that map to guest page table pages to indicate that the entries map to guest page table pages; and
      upon a write by guest software to a memory page and as a synchronous programmatic response thereto, if the processor refers to the address translation cache to determine a machine address for the memory page, determine whether the entry in the address translation cache that contains the machine address for the memory page indicates that the memory page is a guest page table page, or if the processor refers to the second page table to determine the machine address for the memory page, determine whether the entry in the second page table that contains the machine address for the memory page indicates that the memory page is a guest page table page, and, if the memory page is a guest page table page, modify the contents of the address translation cache to eliminate an inconsistency between the address translation cache and the guest page table caused by the write to the guest page table page.

32. The computing system of claim 31, wherein the processor is configured to mark the entries in the second page table and in the address translation cache to indicate that the entries map to guest page table pages in conjunction with a memory management unit of the processor performing walks of the second page table.

33. The computing system of claim 31, wherein the processor is configured to mark the entries in the second page table and in the address translation cache to indicate that the entries map to guest page table pages while not executing the virtualization software, and the processor is configured to modify the contents of the address translation cache to eliminate an inconsistency between the address translation cache and the guest page table under the control of the virtualization software.

34. The computing system of claim 31, wherein the processor is further configured to, upon the write by guest software to the memory page, if the memory page is a guest page table page, clear one or more of the entries in the second page table that map to the guest page table page so as not to indicate that the entries map to the guest page table page.

35. A non-transitory computer readable storage medium containing program instructions for maintaining synchronization between an address translation cache of a processor and a guest page table in a virtualized computer system, in which guest software maintains the guest page table containing address translations from guest virtual addresses to guest physical addresses, and virtualization software maintains a second page table containing address translations from guest physical addresses to machine addresses, the processor using the guest page table and the second page table to determine translations from guest virtual addresses to machine addresses, wherein execution of the program instructions by the processor of the virtualized computer system causes the processor to carry out the steps of:
marking entries in the second page table that map to guest page table pages to indicate that the entries map to guest page table pages, wherein the second page table contains address translations from guest physical addresses to machine addresses; and
upon a write by guest software to a memory page, determining whether the entry in the second page table that contains the machine address for the memory page indicates that the memory page is a guest page table page, and, if the memory page is a guest page table page, modifying the contents of the address translation cache to eliminate an inconsistency between the address translation cache and the guest page table caused by the write to the guest page table page.

36. The computer readable storage medium of claim 35, wherein the step of marking entries to indicate that the entries map to guest page table pages is performed in conjunction with performing walks of the second page table by a memory management unit of the processor.

37. The computer readable storage medium of claim 35, wherein the step of marking entries to indicate that the entries map to guest page table pages is performed by the processor while not executing the virtualization software and the step of modifying the contents of the address translation cache to eliminate an inconsistency between the address translation cache and the guest page table is performed under the control of the virtualization software.

38. The computer readable storage medium of claim 35, further comprising program instructions causing the processor to carry out the step of:
upon the write by guest software to the memory page, if the memory page is a guest page table page, clearing one or more of the entries in the second page table that map to the guest page table page so as not to indicate that the entries map to the guest page table page.

39. A computing system, comprising:
a processor having an address translation cache;
guest software executed by the processor and configured to maintain a guest page table containing address translations from guest virtual addresses to guest physical addresses; and
virtualization software executed by the processor and configured to maintain a second page table containing address translations from guest physical addresses to machine addresses;
wherein the processor is configured to use the guest page table and the second page table to determine translations from guest virtual addresses to machine addresses, wherein the processor is further configured to:
mark entries in the second page table that map to guest page table pages to indicate that the entries map to guest page table pages, wherein the second page table contains address translations from guest physical addresses to machine addresses; and
upon a write by guest software to a memory page and as a synchronous programmatic response thereto, determine whether the entry in the second page table that contains the machine address for the memory page indicates that the memory page is a guest page table page, and, if the memory page is a guest page table page, modify the contents of the address translation cache to eliminate an inconsistency between the address translation cache and the guest page table caused by the write to the guest page table page.

40. The computing system of claim 39, wherein the processor is configured to mark the entries to indicate that the entries map to guest page table pages in conjunction with a memory management unit of the processor performing walks of the second page table.

41. The computing system of claim 39, wherein the processor is configured to mark entries to indicate that the entries map to guest page table pages while not executing the virtualization software, and wherein the processor is configured to modify the contents of the address translation cache to eliminate an inconsistency between the address translation cache and the guest page table under the control of the virtualization software.

42. The computing system of claim 39, wherein the processor is further configured to, upon the write by guest software to the memory page, if the memory page is a guest page table page, clear one or more of the entries in the second page table that map to the guest page table page so as not to indicate that the entries map to the guest page table page.

* * * * *